May 22, 1951  J. BROWN  2,554,292
HANDLE BAR FOR A STEERING WHEEL OF A VEHICLE
Filed Dec. 21, 1949

*INVENTOR.*
*JACK BROWN*
BY
Mawhinney & Mawhinney
Attys.

Patented May 22, 1951

2,554,292

UNITED STATES PATENT OFFICE 2,554,292

HANDLE BAR FOR A STEERING WHEEL OF A VEHICLE

Jack Brown, Leamington Spa, England, assignor to Bowecrofts (Developments) Limited, Coventry, England Application December 21, 1949, Serial No. 134,183
In Great Britain January 28, 1949

7 Claims. (Cl. 74—551.5)

This invention relates to a handle-bar, such as is used in a cycle, of the kind including a pair of similar hand-grip portions adjustably connected with a support, such as the steerable fork stem in the case of a cycle.

The main object of the invention is to provide an improved form of handle-bar which can be quickly adjusted in a very simple and satisfactory manner.

According to the invention, the two hand-grip portions are hinged together by means of a pivot which is guided for movement relatively to the support, as by having a slotted engagement therewith, and the said portions have similar slotted connections with a projection which is fast with the support to limit the pivotal movement of the said portions while the pivot is being guided relatively to the support. In addition, provision is made for releasably locking the said portions in adjusted positions.

When the support is a tube, the pivot may be fast with a plunger slidably fitted in the tube and serving to take the main part of the bearing load. Preferably the slotted connections include similar curved slots in the hand-grip portions which are not concentric with or arcuate about the axis of the pivot. The projection may be a bolt the head of which has an angular locating engagement with the slot of one of the hand-grip portions, and locking can be effected by means of a nut on the bolt which, when tightened, clamps both the said portions to the support.

Figure 2:
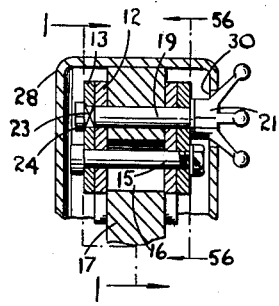
Figure 2 is a sectional elevation taken on the line 2—2 of Figure 1.
Figure 3:
Figure 3 is an elevational view, corresponding to that of Figure 1, of the upper end of the support, i. e., the fork stem in the case of a cycle.
Figure 4:
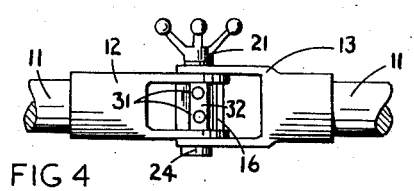
Figure 4 is a fragmentary plan, with the cover removed, to a small scale.

The handle-bar shown includes two similar hand-grip portions 11, 11, only the adjacent ends thereof being shown, which are secured to forks 12, 13 respectively, the prongs of the latter straddling those of the former as shown most clearly by Figures 2 and 4. The forks are pivotally connected to one another by means of a pivot 15, in the form of a bolt and a nut, which works in a generally vertical slot 16 in the handle-bar support 17, being guided by the slot for movement in a longitudinal direction of the support. As will be well understood, in the case of a cycle the support 17 is the upper end of the steerable front fork.

Figure 5:
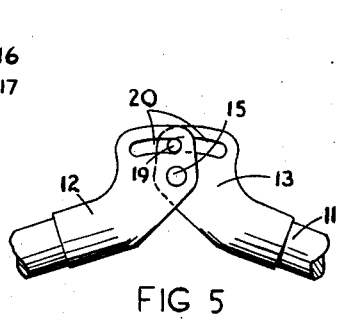
Figures 5 and 6 are two elevational views looking in the direction of the arrows 56—56, and to the smaller scale of Figure 4, showing the hand-grip portions in their two extreme positions respectively.
Figure 6:
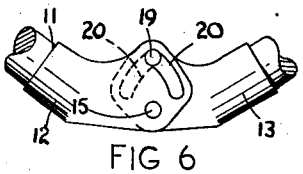
Figure 7:
Figure 7 is a perspective view of the locking bolt to a much larger scale.

The support 17 also carries a projection shown as a bolt 19, and each end of the bolt engages in generally similar curved slots 20, 20 in the adjacent prongs of the forks. The curved slots, it will be noted, are not concentric with or arcuate about the axis of the pivot 15. They are, however, arranged so that when the hand-grip portions 11 are pivotally moved with respect to one another between the extreme positions shown by Figures 5 and 6, the pivot 15 will travel along the length of the slot 16. A nut 21 on the threaded end of the bolt 19 can be tightened to clamp the two forks against the support 17.

Figure 1:
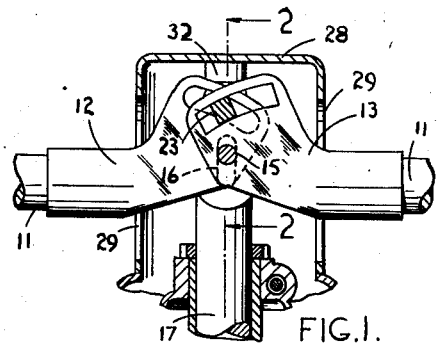
Figure 1 is a vertical sectional elevation, from the front, indicating one arrangement of handle-bar according to the invention (only the adjacent ends of the hand-grip portions and of the support therefor being shown), the section being taken on the line 1—1 of Figure 2.

To facilitate this latter operation the bolt 19 conveniently has a non-circular portion 23, adjacent its head 24, which is mounted in the slot 23 of the adjacent prong of the fork 13, as shown by Figures 1 and 2, whereby to locate the bolt against angular movement with respect to the fork 13. The bolt also has radial gripping serrations 25 on the appropriate face of its head.

It will be observed that when either hand-grip portion is moved in a vertical direction the other is constrained to effect a similar movement. When the portions have been adjusted to a desired position the nut 21 can be tightened to clamp the portions in the adjusted position as aforesaid.

Figure 8:
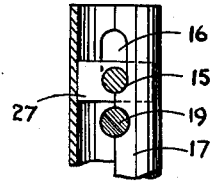
Figure 8 is a sectional elevation, to a larger scale than that of Figure 3, of the support in a modification according to the invention.

It will be evident that the slot 16 in the support could alternatively be placed above the projection 19 instead of below it, as indicated by the modification of Figure 8, both the hand-grip portions being then inverted.

Figure 8 also indicates how, when the support 17 is a tubular one, the pivot 15 may be carried by a plunger 27 which is slidingly guided in the interior of the support and serves for taking the main part of the bearing load.

For preference the adjacent ends of the hand-grip portion are enclosed by a cover such as that indicated at 28, having slots 29 in each side through which the two forks extend, and having a rear opening 30 to which the threaded end of the bolt 19 extends to receive the nut 21. The cover can be secured to the support by screws engaged in two holes 31 (Figure 4) in the reduced upper extremity 32 of the support.

What I claim as my invention and desire to secure by Letters Patent of the United States is:

1. A handle-bar, such as is used on a cycle, comprising a pair of similar hand-grip portions hinged to one another by a pivotal means, a support having means for guiding said pivotal means relatively to said support, a projection fast with said support and engaged with similar slots in said portions to limit the pivotal movement of said portions while said pivotal means is being guided as aforesaid, and means for releasably locking said portions in adjusted positions.

2. A handle-bar, such as is used on a cycle, comprising a pair of similar hand-grip portions hinged to one another by a pivot, a support having a slot in it to receive and slidingly guide said pivot, a projection fast with said support and engaged with similar slots in said portions to limit the pivotal movement of said portions while said pivot is being guided as aforesaid, and means for releasably locking said portions in adjusted positions.

3. A handle-bar, such as is used on a cycle, comprising a pair of similar hand-grip portions hinged to one another by a pivot, a tubular support having a slot in it to receive and slidably guide said pivot, and having in it a slidably guided plunger carrying said pivot, an external projection fast with said support and engaged with similar slots in said portions to limit the pivotal movement of said portions while said pivot is being guided as aforesaid, and means for releasably locking said portions in adjusted positions.

4. A handle-bar, such as is used on a cycle, comprising a pair of similar hand-grip portions hinged to one another by a pivotal means, a support having means for guiding said pivotal means relatively to said support, a pin fast with said support and engaged with similar curved slots in said portions to limit the pivotal movement of said portions while said pivotal means is being guided as aforesaid, said curved slots being other than arcuate about the axis of said pivot, and means for locking said portions in adjusted positions.

5. A handle-bar, such as is used on a cycle, comprising a pair of similar hand-grip portions hinged to one another by a pivot, a support having a slot in it for receiving and guiding said pivot relatively to said support, a bolt carried by said support and engaged with similar slots in said portions to limit the pivotal movement of said portions while said pivot is being guided as aforesaid, and a nut on the end of said bolt for locking said portions in adjusted positions.

6. A handle-bar, such as is used on a cycle, comprising a pair of similar hand-grip portions hinged to one another by a pivot, a support having a slot in it for receiving and guiding said pivot relatively to said support, a bolt carried by said support and engaged with similar slots in said portions to limit the pivotal movement of said portions while said pivot is being guided as aforesaid, and a nut on the end of said bolt for locking said portions in adjusted positions, said bolt having a non-circular portion engaged in the slot of one of said portions to angularly locate said bolt with respect thereto.

7. A handle-bar, for a cycle, comprising a pair of similar hand-grip portions hinged to one another by a horizontal pivot, a fork stem having a vertical slot in it for guiding said pivot for up-and-down adjustment, said portions having forked ends to engage said pivot on opposite sides of said support, a transverse bolt fast with said support having each of its ends engaged with similar curved slots in said forked ends to limit the pivotal movement of said portions while said pivot is being guided as aforesaid, said curved slots being arcuate about an axis which is parallel to that of said pivot, and a nut on said bolt for locking said portions in adjusted positions.

JACK BROWN.

REFERENCES CITED

The following references are of record in the file of this patent:

UNITED STATES PATENTS

| Number | Name | Date |
|--------|------|------|
| 566,068 | Erb | Aug. 18, 1896 |
| 575,879 | Dunn | Jan. 26, 1897 |